United States Patent
Müller

(10) Patent No.: US 8,099,998 B2
(45) Date of Patent: Jan. 24, 2012

(54) APPARATUS AND METHOD FOR ESTIMATING STOPPED ENGINE CRANK ANGLE

(75) Inventor: Martin Müller, Commerce Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 66 days.

(21) Appl. No.: 12/783,075

(22) Filed: May 19, 2010

(65) Prior Publication Data

US 2011/0288752 A1 Nov. 24, 2011

(51) Int. Cl.
*G01M 15/06* (2006.01)
(52) U.S. Cl. .................................. 73/114.26
(58) Field of Classification Search ............. 73/114.25, 73/114.26, 114.27, 114.28
See application file for complete search history.

(56) References Cited

U.S. PATENT DOCUMENTS

| | | | |
|---|---|---|---|
| 6,499,342 B1 | 12/2002 | Gonzales, Jr. | |
| 6,681,173 B2 | 1/2004 | Turner et al. | |
| 6,684,687 B1 | 2/2004 | Frojdh | |
| 6,988,031 B2 | 1/2006 | McDonald et al. | |
| 7,011,063 B2 | 3/2006 | Condemine et al. | |
| 7,079,939 B2 | 7/2006 | Kataoka et al. | |
| 7,142,973 B2 | 11/2006 | Ando | |
| 7,156,083 B2 | 1/2007 | Nakamura | |
| 7,360,406 B2 | 4/2008 | McDaniel et al. | |
| 7,562,650 B2 * | 7/2009 | Tabata et al. | 123/491 |
| 2004/0149251 A1 * | 8/2004 | Nishikawa et al. | 123/198 DB |
| 2004/0153235 A1 * | 8/2004 | Kataoka et al. | 701/112 |

OTHER PUBLICATIONS

McDonald, Dennis; Engine Position Tracking At Shutdown, SAE International, SAE Technical Paper Series (2005), 2005-01-0048.
Fulks, Gary C., U.S. Appl. No. 12/788,412, filed May 27, 2010, Apparatus and Method for Estimating Bounce Back Angle of a Stopped Engine.

* cited by examiner

*Primary Examiner* — Eric S McCall
(74) *Attorney, Agent, or Firm* — Lawrence D. Hazelton

(57) ABSTRACT

An engine control system, controller, and method for estimating a stopped engine crank angle of an internal combustion engine. Typical crank sensors do not output a reliable crank signal when the engine is about to stop, and do not indicate crank direction which is necessary to determine if engine bounce-back occurs. A crank sensor signal is analyzed as the engine coasts to a stop so that a coast-down model can be adjusted to accurately estimate the stopped engine crank angle. A bounce-back model is also used to estimate an engine bounce-back angle and to make further corrections to the estimated stopped engine crank angle.

13 Claims, 6 Drawing Sheets

APPARATUS AND METHOD FOR ESTIMATING STOPPED ENGINE CRANK ANGLE

TECHNICAL FIELD OF INVENTION

The invention generally relates to controlling an internal combustion engine, and more particularly relates to estimating a stopped engine crank angle of the engine crankshaft relative to an engine combustion cycle after the engine is stopped.

BACKGROUND OF INVENTION

It is known to use a crankshaft sensor to determine a crank angle of an internal combustion engine crankshaft for providing engine control timing information as part of controlling an engine combustion cycle. Such timing information is, for example, useful to control the timing of dispensing fuel by a fuel injector, or control the timing of a spark ignition device. It is desirable to know the stopped engine crank angle after an engine is stopped to facilitate restarting the engine. If the stopped engine crank angle is known prior to restarting the engine, engine cranking time and engine emissions may be reduced. Crank angle and crank speed of a running engine are determined using various types of crankshaft sensors including variable reluctance (VR) type sensors, Hall effect type sensors, and inductive type sensors. However, while such sensors are an economical choice for determining crank angle and crank speed, they do not readily indicate crank angle when the crankshaft is not rotating. Furthermore, such sensors do not indicate the direction of crankshaft rotation, as is needed if engine bounce-back occurs when the engine is stopped. Engine bounce-back occurs when the content of a cylinder is compressed just as the engine stops which may then cause the engine to rotate in a direction that is opposite of the normal engine running direction. Furthermore, such sensors may output a signal having an amplitude that is too low to be reliably detected when the engine speed is low, such as less than 50 revolutions per minute, as would occur when the engine is being stopped.

A number of methods for determining the stopped engine crank angle using such crankshaft sensors have been proposed. For example, U.S. Pat. No. 7,142,973 to Ando suggests a method that controls when the initiation of stopping an engine occurs so that the engine coasts to a stop in more predictable manner. However, Ando uses a predetermined coast-down model that relies on the engine being properly warmed up and operating at nominal operating conditions to coast-down to a stop in a predictable manner. If the engine is not warmed up, or not operating at nominal conditions, Ando's model is not accurate so Ando does not attempt to determine a stopped engine crank angle. Furthermore, Ando is silent with regard to the effect of engine bounce-back. U.S. Pat. No. 7,011,063 to Condemine et al. suggests another method that delivers fuel to at least one cylinder while the engine is coasting to a stop to more accurately control the coast-down process. However, such a method may increase fuel consumption and increase engine emissions due to incomplete fuel combustion. Like Ando, Condemine also relies on a predetermined coast-down model to predict the engine stopped crank angle and does not consider the effect of engine bounce-back. U.S. Pat. No. 6,499,342 to Gonzales monitors the amplitude and period of a variable reluctance sensor signal to estimate the stopped engine crank angle. However, analyzing such a signal in the manner described adds cost and complexity to the signal processing electronics. Also, like Ando and Condemine, Gonzales does not address the effect of engine bounce-back.

SUMMARY OF THE INVENTION

In accordance with one embodiment of this invention, an engine control system for estimating a stopped engine crank angle of an internal combustion engine is provided. The system includes a crank sensor and a controller. The crank sensor is configured to output a crank signal indicative of a crank angle and a crank speed. The controller is configured to determine the crank speed based on the crank signal, determine that the engine is coasting, and determine a coast-down characteristic based on the crank signal when the crank speed is greater than a threshold speed. The controller is also configured to estimate the stopped engine crank angle based on the coast-down characteristic.

In another embodiment of the present invention, an engine controller for estimating a stopped engine crank angle of an internal combustion engine is provided. The controller is configured to receive a crank signal indicative of a crank angle and a crank speed. The controller is further configured to determine the crank speed based on the crank signal, determine that the engine is coasting, and determine a coast-down characteristic based on the crank signal when the crank speed is greater than a threshold speed. The controller is also configured to estimate the stopped engine crank angle based on the coast-down characteristic.

In yet another embodiment of the present invention, a method for estimating a stopped engine crank angle of an internal combustion engine is provided. The method includes the step of providing a crank sensor configured to output a crank signal indicative of a crank angle and a crank speed. The method also includes the steps of determining that the engine is coasting, determining a coast-down characteristic based on the crank signal when the crank speed is greater than a threshold speed, and estimating the stopped engine crank angle based on the coast-down characteristic.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
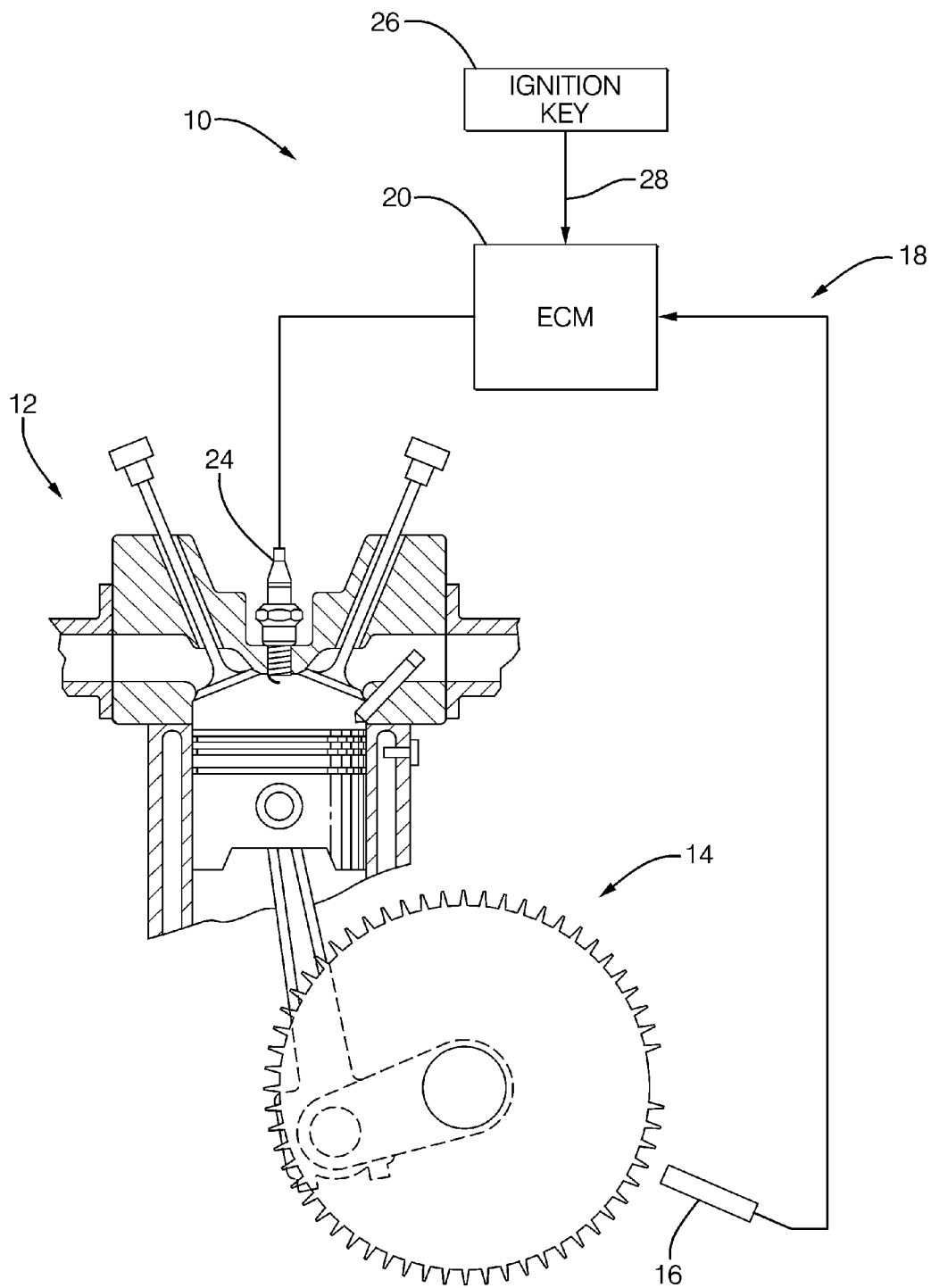
FIG. 1 is a cut-away view of an internal combustion engine having an engine control system in accordance with one embodiment.

FIG. 1 illustrates an embodiment of an engine control system 10 for estimating a stopped engine crank angle of an internal combustion engine 12. The engine 12 is illustrated as having a single cylinder; however it will be appreciated that the system 10 may be readily adapted to engines having multiple cylinders. The system 10 may include a sixty minus two (60–2) tooth crank wheel 14 having fifty-eight (58) teeth arranged at six (6) degree angle intervals about the circumference of the crank wheel 14, and an eighteen (18) degree gap between the centers of the first tooth and the fifty-eighth tooth. Crank wheels having other numbers of teeth and different arrangements of variably spaced gaps between teeth may be adapted to estimate the stopped engine crank angle. A crank sensor 16 is positioned proximate to the crank wheel 14 such that the crank sensor 16 is able to sense rotational movement of the crank wheel teeth. Typically, the crank wheel 14 and the teeth are made from a ferrous material, such as steel. As such, as the teeth move through a magnetic field generated by the crank sensor 16, the teeth influence the magnetic field in a way that may be detected, particularly when the crank speed is greater than a threshold speed. It is well known how the arrangement of fifty-eight evenly spaced crank wheel teeth combined with an eighteen degree gap corresponding to a missing fifty-ninth and sixtieth tooth provides for the crank sensor 16 to output a crank signal 18 indicative of a crank angle and a crank speed.

Figure 2A:
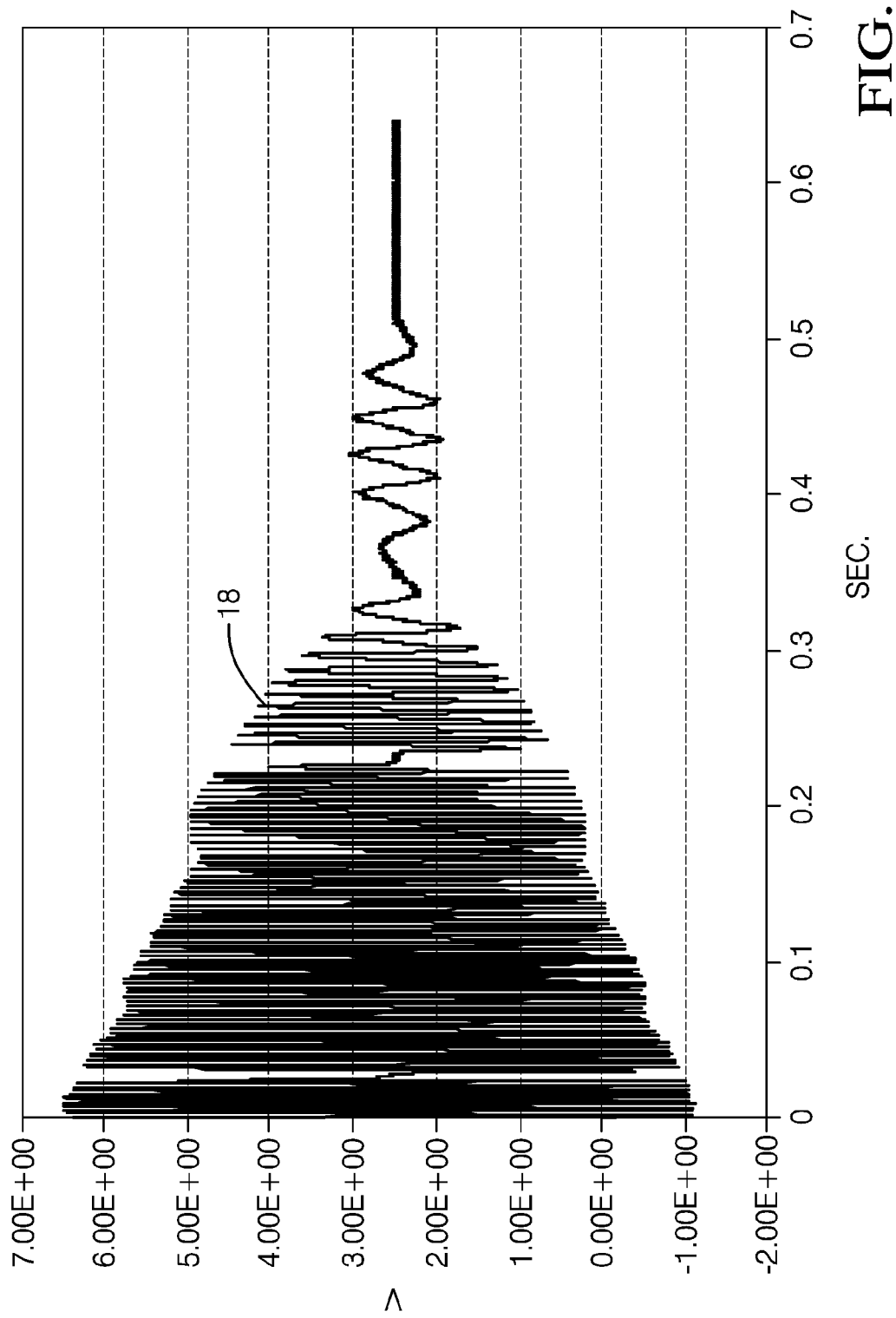
FIGS. 2A and 2B are graphs of signals occurring in the system of FIG. 1 in accordance with one embodiment.

In one embodiment, the crank sensor 16 may be a variable reluctance (VR) sensor. FIG. 2A illustrates a crank signal 18 output by an exemplary VR sensor having a generally sinusoidal shaped waveform. The discontinuities in the crank signal 18 at about 0.03 seconds and 0.23 corresponds to the missing teeth described above. The decreasing frequency and amplitude of the crank signal 18 is a typical characteristic of a signal output by VR sensor when an engine is being stopped, or turned off, or coasting to a stop. When the crank speed is less than a crank speed threshold, less than fifty (50) revolutions per minute (RPM) for example, the amplitude of the signal from a VR sensor may be too small for the crank signal 18 to be reliably detected. Alternately, the crank sensor 16 may be based on a Hall effect type sensor.

Figure 2:
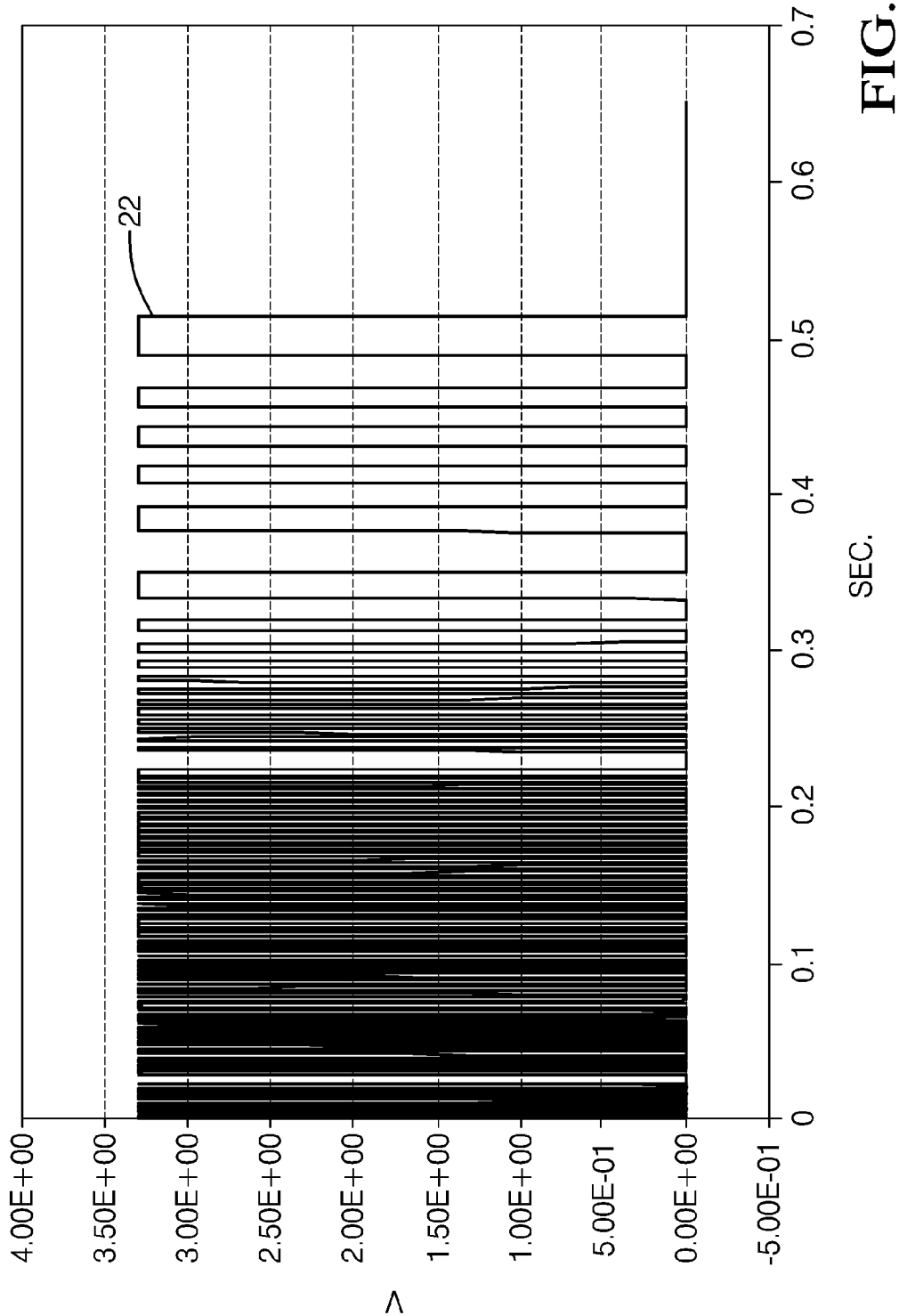
Figure 3:
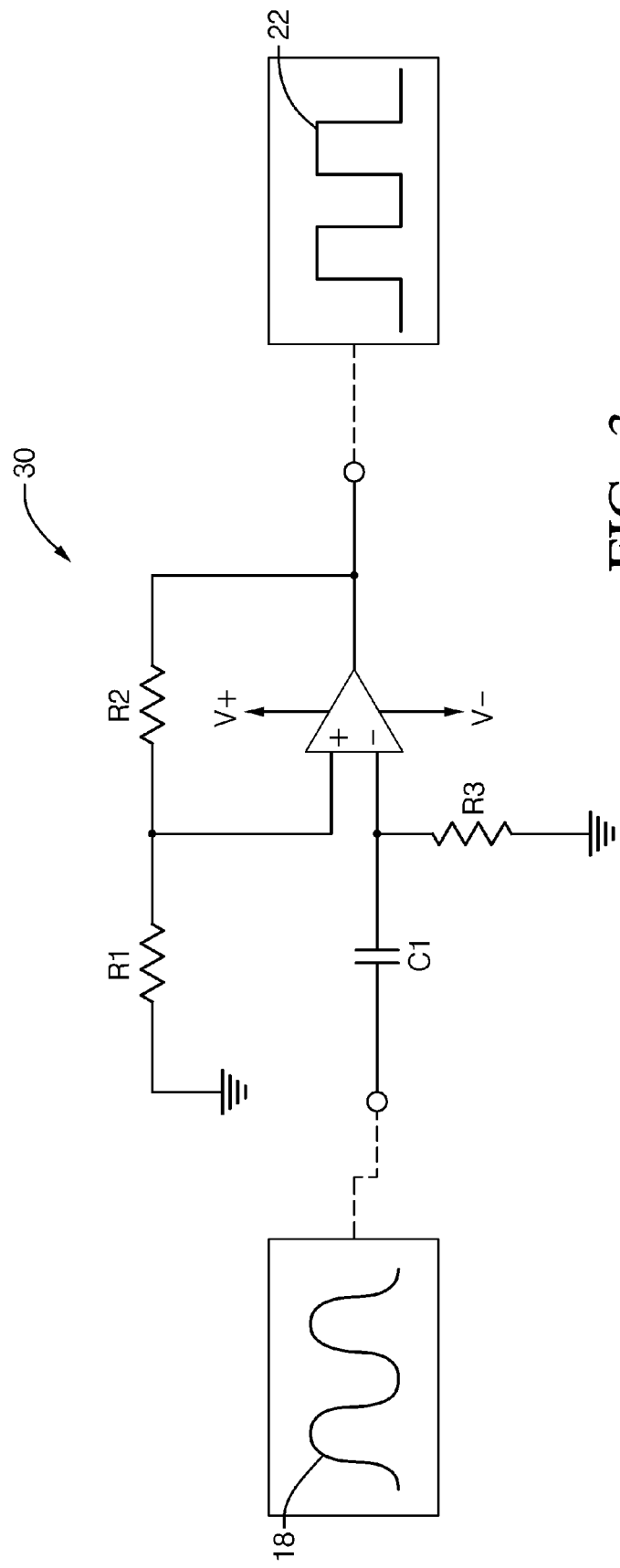
FIG. 3 is a schematic of a zero crossing detector in accordance with one embodiment.

Referring again to FIG. 1, the engine control system 10 may also include a controller 20, such as an engine control module (ECM), configured to determine a crank angle and a crank speed based on the crank signal 18. It may be advantageous for the controller 20 to include a zero-crossing detector for processing the crank signal 18. FIG. 3 illustrates a non-limiting example of a zero-crossing detector 30 that receives the crank signal 18 and outputs a processed crank signal 22 in the form of a square wave having well defined rising edges and falling edges, and constant amplitude, as illustrated in FIG. 2. As illustrated in FIG. 2, the processed crank signal 22 appears to correspond well to the crank signal 18 and no zero crossings appear to be undetected. However, it will be appreciated that some engine control systems may have high levels of electrical noise that may require a level of hysteresis in the zero crossing detector 30 that will lead to missing pulses in the processed crank signal 22. The controller 20 may include other signal processing means known to those skilled in the art for filtering noise from the crank signal 18. Alternately, the zero-crossing detector 30 or other signal processing means may be integrated into the crank sensor 16. Either way, the system 10 may include the means to process the crank signal 18 such that crank signal 18 or processed crank signal 22 comprises a plurality of crank pulses having a waveform that is readily characterized, such as a constant amplitude square wave.

The crank angle and crank speed may be used by the controller 20 to control the operation of a device 24. For example, the device 24 may be a spark plug or a fuel injector.

The presence of a spark plug in FIG. 1 suggests that the engine 12 is a spark ignition type engine. However, it will be appreciated that way of determining a stopped engine crank angle described herein is also applicable to compression ignition type engines. The crank speed 18 may also be used to determine that the engine 12 is coasting. As used herein, coasting means that the engine speed is decreasing and the engine is expected to stop. This may also be referred to herein as a coast-down event. The determination that the engine is coasting may be based on an engine on/off signal 28 generated by a vehicle operator turning an ignition key 26 to an OFF position, or may based on a signal generated within the controller 20 as part of a hybrid electric vehicle control routine, or may be based on the crank speed decreasing due to improper clutch/accelerator operation on a vehicle equipped with a manual transmission such that stalling of the engine 12 is likely.

Figure 4:
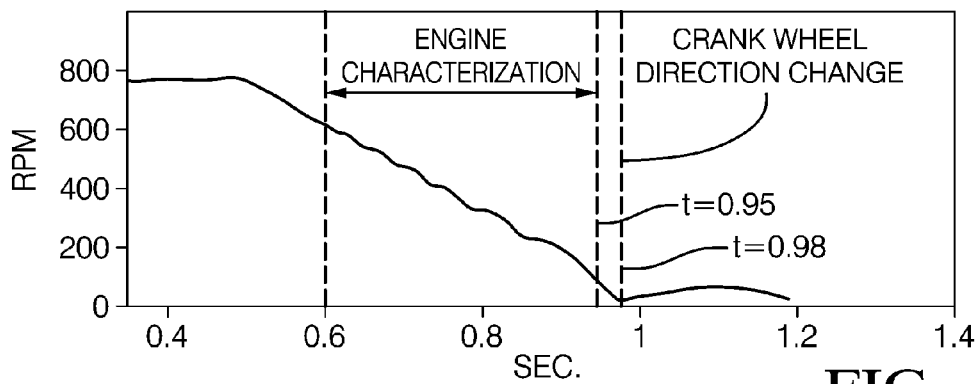
FIGS. 4A, 4B, and 4C are graphs of data corresponding to behaviors of an internal combustion engine in FIG. 1 in accordance with one embodiment.
Figure 4:
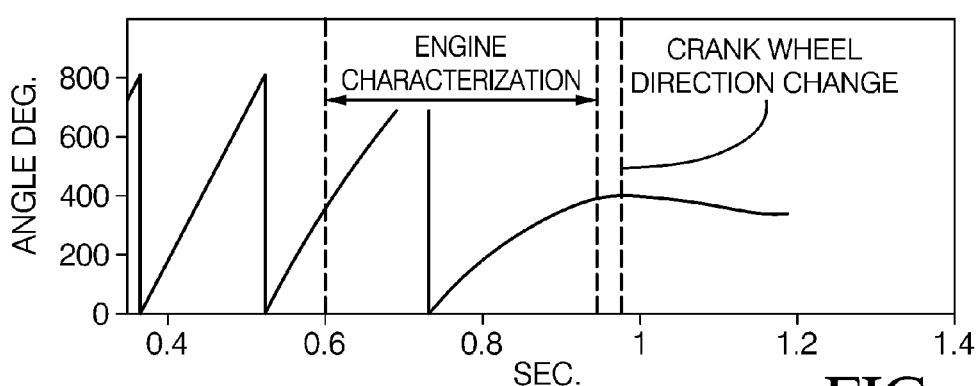
Figure 4:
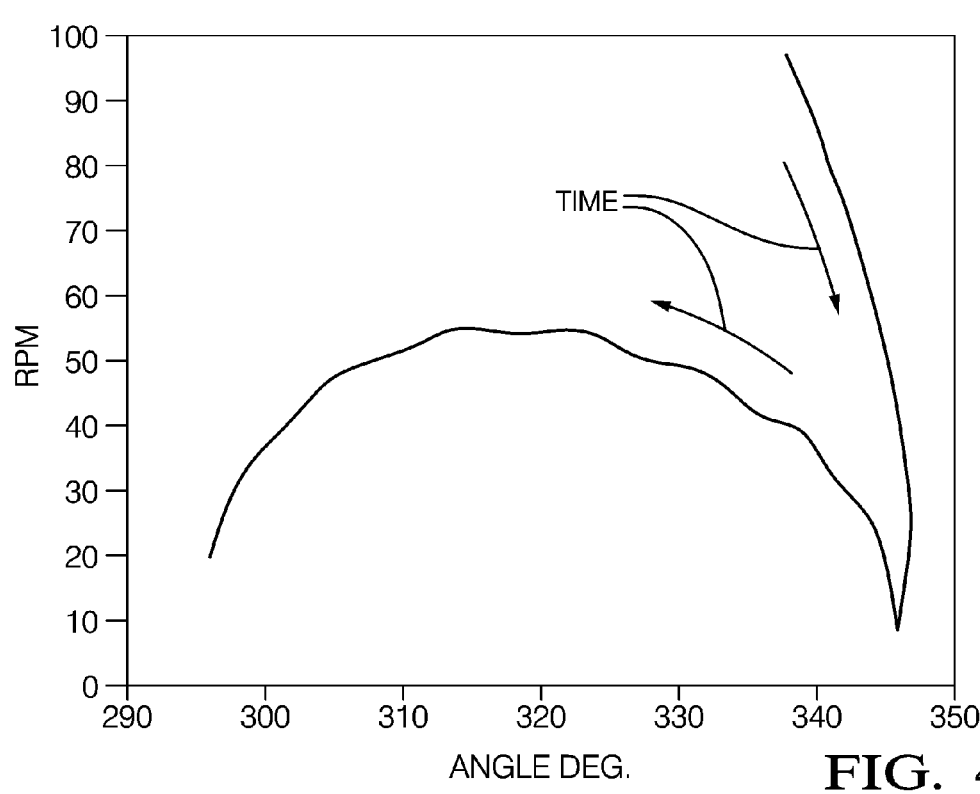

FIG. 4 shows processed data collected from the engine 12 during a coast-down event using laboratory grade equipment that is able to discern a direction of rotation of the crank wheel 14; unlike typical crank sensors such as the crank sensor 16 that may be unable to discern rotation direction. FIG. 4A is a graph of engine RPM versus time during a coast-down event. FIG. 4B is a graph of the angle of crank wheel 14 with respect to time and relative to a combustion cycle, wherein the crank wheel 14 rotates 720 degrees angle for each combustion cycle. As such, at the end of each combustion cycle, the indicated crank wheel angle is reset from 720 degrees to 0 degrees. At about 0.5 seconds in the example data, the ignition key 26 is turned to the OFF position whereby the engine 12 begins coasting.

Data from laboratory equipment indicating crank angle, crank speed, and crank direction may be analyzed to determine a coast-down model. As used herein, the coast-down model is a mathematical description base on laboratory type data that seeks to predict the behavior of an engine coasting to a stop. The model may be based on formulas, look-up tables, or the like. The coast-down model may then be used during subsequent coast-down events under uncontrolled field conditions to predict or estimate a stopped engine crank angle when a crank sensor 16 is used that may not reliably indicate crank angle and crank speed when the crank speed is below a threshold, and does not indicate crank rotation direction. By using the model together with the crank signal 18, a system may be provided that does not rely on expensive laboratory equipment to reliably estimate a stopped engine crank angle. It will be appreciated that the computational burden on the controller 20 may be reduced by predetermining such a baseline or reference coast-down model in a laboratory environment, or the like. Then, when the engine 12 is coasting as part of normal engine use outside of the laboratory, the controller 20 may adjust or tune the coast-down model to better correspond to the engine 12 behavior exhibited at the time the engine 12 is being stopped. In one embodiment, the coast-down model may be based on fitting laboratory data to a mathematical formula that equates crank wheel rotational acceleration AR to frictional torque TF, pumping torque TP, and engine rotational inertia IR. A non-limiting example of such a formula is show here as Equation 1.

$$AR=(TF+TP)/IR \qquad \text{Equation 1}$$

As used herein, the rotational inertia IR may correspond to the physical dimensions and weight of the crankshaft, flywheel, harmonic balancer, pistons, connecting rods, and other parts that are known to influence the rotational inertia of the engine 12. In general, the rotational inertia is established by the design of the engine, and so is not expected to vary substantially over the life of the engine, unless some engine component having substantial rotational inertia is removed or disconnected from the rotating mass of the engine 12. In general, larger, higher displacement engines are expected to have greater rotational inertia IR than smaller engines. The coast-down model value of the rotational inertia IR is scaled to cooperate with the other variables in Equation 1 to provide a coast down model that mimics the behavior shown in FIG. 4.

As used herein, the frictional torque TF in Equation 1 may correspond to friction and or a load that in general slows the engine 12 at a constant rate during a coast-down event. Such a load or friction may generally be caused by, but not limited to, piston-to-cylinder wall friction, crankshaft/camshaft bearing friction, camshaft to lifter friction, oil pump and/or water pump seal friction, or fluid circulation loads. In FIG. 4A, a measurement of the slope of the graph between 0.6 seconds and 0.9 seconds may be useful to characterize or indicate the frictional torque TF acting on the engine 12. Such a measurement may include calculating a slope based an average or root-mean-square (RMS) slope indicated by a plurality of crank pulses during a coast-down event. It has been observed that the frictional torque TF may vary substantially due to, for example, engine break-in and wear-out, differences in engine oil lubricity, and engine operating temperature. As such, the frictional torque TF is expected to vary from one coast-down event to the next. The frictional torque TF for some engines has also been observed to be substantially constant during a single coast-down event, and so the frictional torque TF portion of the coast-down model may be configured as a predetermined constant, and then be adjusted by determining a frictional torque coast-down characteristic based on, for example, an average slope of the crank speed during each coast-down event as part of an engine characterization. It should be appreciated that some engines have devices coupled to the engine that may contribute to the frictional torque TF and may also change that contribution as the engine slows. For example, an air-conditioning compressor may disengage if the crank speed is less than some threshold, and thereby change the total frictional torque TF on the engine 12 during a coast-down event. For such a case the model of the frictional torque TF may need to comprehend this behavior.

As will become evident in the following description, the coast-down model described herein is generally directed to describing the coast-down behavior of the engine 12 in a laboratory environment when crank rotation direction is known. In contrast, the coast-down characteristic is generally directed to describing the coast-down behavior of the engine 12 outside of the laboratory environment. The frictional torque TF portion of the coast-down model may be determined based on a rate of deceleration for one or more of sets of data similar to that shown in FIG. 4A. Then, during a subsequent, i.e.—outside the laboratory, coast-down event, the frictional torque TF portion of the coast-down model may be adjusted by determining a correction or compensation to the frictional torque TF portion of the coast-down model based on data from the crank sensor 16 collected during the instant coast-down event. By adjusting or tuning the coast-down model during a subsequent coast down event, a more accurate estimate of the stopped engine crank angle may be provided. Once the coast down model is tuned to match the engine behavior during the engine characterization portion of the coast down event, and the crank speed becomes too low to provide a reliable crank signal, the tuned coast down model can be used to estimate or project the stopped engine crank angle. It will be appreciated that the coast-down model value of the frictional torque TF is scaled to cooperate with the other variables in Equation 1 to provide a coast down model that mimics the behavior shown in FIG. 4.

As used herein, the pumping torque TP may correspond to a torque or load applied to the crank during coast-down that is generally attributed to one or more pistons compressing and de-compressing the contents of cylinders guiding each piston. FIG. 4A illustrates a variation or ripple in the RPM data during engine coast-down characterization between 0.6 seconds and 0.9 seconds. A measurement of the average or root-mean-square (RMS) amplitude of the variation may be used as an indicator of the pumping torque TP. Alternately, the pumping torque TP characteristic may be described by a mathematical equation or a look-up table tabulation showing a unique waveform characteristic. Like the frictional torque TF described above, the pumping torque TP portion of the base line or reference coast-down model may be determined by analyzing signals from laboratory sensors. Then, during a subsequent coast-down event as part of normal engine 12 operation, the pumping torque TP portion of the coast-down model may be adjusted based on data from the crank sensor 16 to better estimate or project the stopped engine crank angle after the crank speed is too low for the crank sensor 16 to provide a reliable crank signal.

It has been observed that some engines have a pumping torque characteristic that is substantially constant over a range of engine temperatures and other operating conditions for a given throttle valve or combustion chamber valve positions, and so the pumping loss model may not need to be adjusted for each coast-down event. However, it will be appreciated that the pumping losses may vary substantially in the event of reduced cylinder compression in one or more cylinders due to such factors as a cylinder valve being stuck open, or a damaged cylinder to piston interface. A non-limiting, exemplary pumping torque TP model for an automotive engine may be K1 cosine (K2*A), where K1 corresponds to an amplitude of deviation from a first order fit of the engine characterization data between 0.6 and 0.95 seconds in FIG. 4A, and K2 may correspond to the configuration of the engine. For example, if the engine is a four-cylinder engine configured such that a compression stroke is performed by one piston at a time and are evenly distributed every 180 degrees of a 720 degree combustion cycle, a suitable K2 would be 2, whereas a six-cylinder engine may have a K2 value of 3.

Once a coast-down model is determined by modeling the pumping torque TP and the frictional torque TF using laboratory equipment, the coast-down model may be stored in the controller 20. During subsequent coast-down events, the coast-down model may be adjusted or tuned to compensate for variations in engine behavior during the subsequent coast-down events by analyzing the crank signal 18 to determine a unique coast-down characteristic adapted to adjust the coast-down model to better match the behavior exhibited by the engine 12. This adjustment or tuning of the coast-down model is performed while the crank speed is high enough for the crank sensor 16 to provide a reliable crank signal 18. The coast-down characteristic may include one or more coefficients that may be applied to the coast-down model to tune the model to better reflect the behavior of the engine 12 during the present coast-down. For example, if the engine 12 is coasting down at an average rate of deceleration that is faster or steeper than that shown in FIG. 4A and used to determine the coast-down model, then the frictional torque TF of the coast-down model may be adjusted or tuned by multiplying the frictional torque TF by a coefficient greater than 1. It will be appreciated that the frictional torque TF could be simply increased to tune the coast-down model for the increased rate of deceleration.

However, for the purpose of explanation the frictional torque TF and other terms of the coast-down model are described as being fixed, predetermined values, and the coast-down characteristic is described as one or more coefficients that adjust or tune the coast-down model to match the present coast-down event. As such, a stopped engine crank angle may be estimated based on using the coast-down characteristic to adjust the previously determined coast-down model. By tuning or adjusting the coast-down model to correspond to the current engine operating condition, the tuned coast-down model may more accurately estimate a stopped engine crank angle of the internal combustion engine 12.

Determining the coast-down characteristic is advantageously performed when the crank speed is greater than a threshold speed so that the crank signal 18 has sufficient amplitude to be reliably analyzed. In one embodiment, the crank speed is based on one or more time intervals between crank pulses. When more than one time interval is used to determine the crank speed, the time intervals may be measured between several consecutive pulses, or may be time intervals between a common starting pulse and one or more subsequent pulses.

In another embodiment the stopped engine crank angle may also be based on an estimate of a bounce-back angle. As used herein, the bounce-back angle is the amount of crank angle that the crank wheel 14 moves in a direction typically opposite the normal or forward direction of rotation by the crank wheel 14 when the engine 12 is running. As explained above, the laboratory equipment used to generate FIGS. 4A-4C is typically able to indicate the rotational direction of crank wheel 14, but crank sensors typically used in engine control system do not detect or indicate the rotational direction of the crank wheel 14. In general, bounce-back is caused by air or other material present in the cylinder being in a compressed state at the instant that the crank wheel 14 stops forward rotation. This compressed material may cause the engine and crank wheel 14 to move backward by an amount that may be estimated by determining a bounce-back model using laboratory equipment and then adjusting the bounce-back model based on the coast-down characteristic determined by analyzing the crank signal 18. In one embodiment, the bounce-back model preferably has the same form as the coast-down model, such as a constant for frictional torque TF and a trigonometric function for the pumping torque TP. In this embodiment, it is generally assumed that the operating conditions of the engine 12 do not change if bounce-back occurs, and so the model used to estimate the crank angle when the crank speed first reaches zero can be used to project or estimate crank motion following a crank rotation direction reversal that leads to an accumulation of bounce-back angle. Alternately, the bounce-back model may have a different form and/or different values because the throttle valve or combustion chamber valve are held open or closed during coast-down for reasons that may or may not be related to improving the reliability of estimating the stopped engine crank angle.

FIG. 4A illustrates that the RPM of the engine is zero at about 0.98 seconds. FIG. 4B illustrates that the slope of the angle data changes from positive to negative at about 0.98 seconds, thereby indicating that the engine has moved in a reverse direction and bounce-back has occurred. FIG. 4C illustrates a combination of data from FIGS. 4A and 4B after about 0.95 seconds to better illustrate the bounce-back phenomena. In FIG. 4C, as time progresses, the engine slows to near zero RPM and a crank angle of about 349 degrees. Then the engine rotates in a reverse direction so that the RPM momentarily increases as the angle begins to decrease from about 349 degrees to a stopped engine crank angle of about 305 degrees. The curve shown in FIG. 4C may be used to verify that the model used while the engine is rotating in the forward direction can be used to project engine behavior while rotation in the reverse direction. Alternately, FIG. 4C may be used establish a generic bounce-back model, or a unique bounce back model specifically for when an engine reversal crank angle of 349 degrees occurs. It should be appreciated that different engine reversal crank angles, that is the crank angle where the crank wheel rotation stops forward rotation and begins reverse rotation, may result in different amounts of bounce-back and therefore different engine stopped crank angles. As such, laboratory data for a plurality of engine reversal crank angles may be required to determine a reliable bounce-back model. It should also be appreciated that a second reversal may occur wherein following the engine rotating in a reverse direction a corresponding bounce-back angle, the engine may again reverse direction and in essence, bounce forward and subtract from the accumulated bounce back angle.

Figure 5:
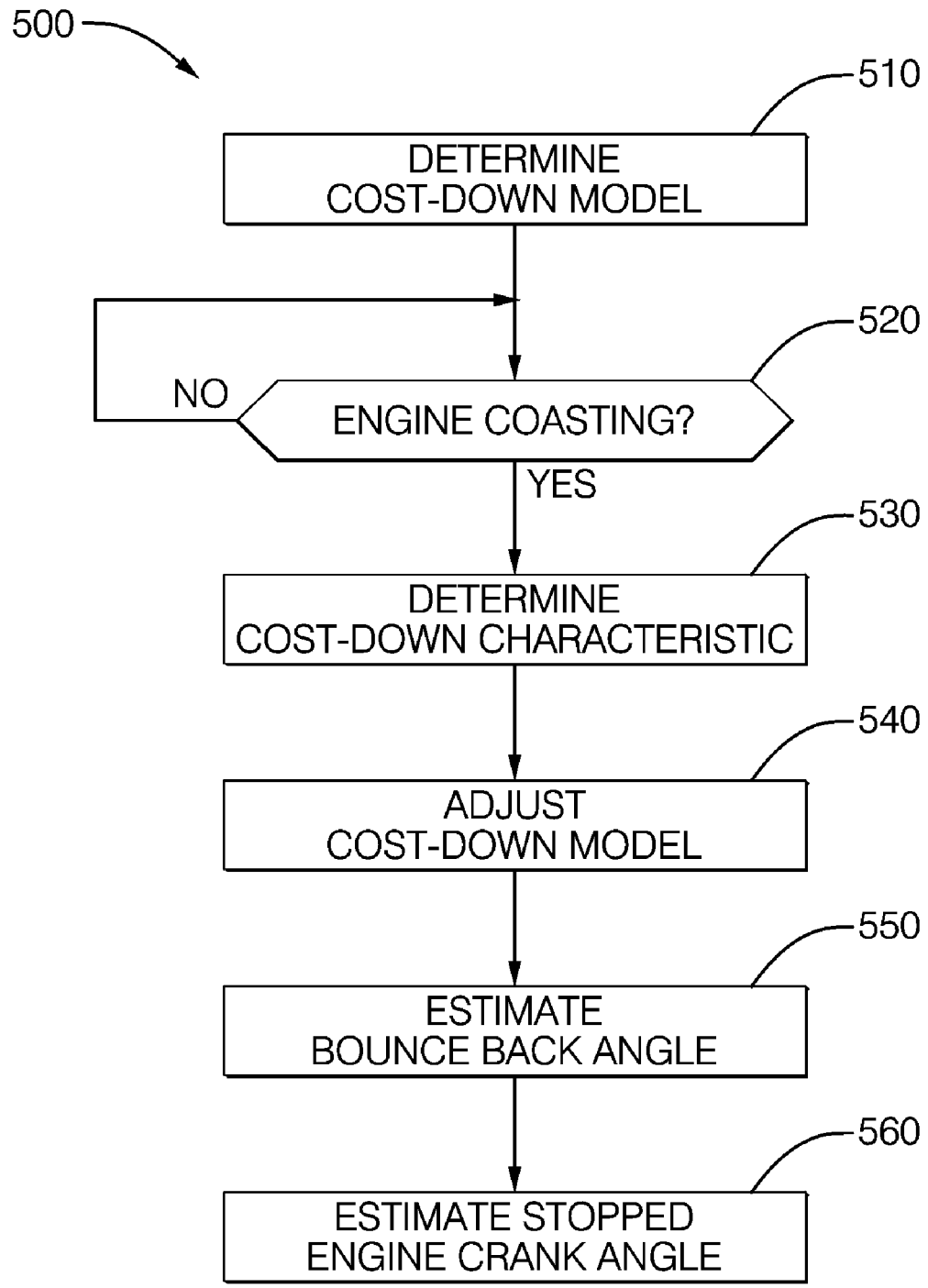
FIG. 5 is flowchart of a method to estimate a stopped engine crank angle of an internal combustion engine in FIG. 1 in accordance with one embodiment.

FIG. 5 illustrates a method or routine 500 for estimating a stopped engine crank angle of an internal combustion engine. At step 510, a coast-down model is determined. The coast-down model is preferably determined under relatively controlled conditions, preferably using laboratory grade equipment. An exemplary, non-limiting example of a coast down model is described above. It may be necessary to record coast-down data for a variety of engine operating conditions such as the engine 12 operating at temperatures greater than, less than, and at a typical operating temperature. The coast-down model may then be stored in the controller 20 for later used when the engine 12 is being stopped during uncontrolled conditions. At step 520, the controller 20 determines if engine is coasting and so is expected to stop. For example, if the ignition key 26 is in the ON position and the crank speed indicated by the crank sensor 16 is equal to or greater than an engine idle speed, 650 RPM for example, then the engine is likely not coasting and so step 520 is repeated. However, if, for example, if the ignition key 26 is in the OFF position and the engine speed is less than the engine idle speed, then the engine may be coasting and so the routine continues to step 530.

At step 530, the crank signal 18 may be received and analyzed by the controller 20 while the crank speed is greater than a threshold speed and a coast-down characteristic is thereby determined. Receiving the crank signal 18 may include processing the crank signal 18 illustrated in FIG. 2A to generate a processed crank signal 22 illustrated in FIG. 2B that comprises a plurality of crank pulses indicative of crank angle and crank speed. In one embodiment, as each crank pulse is received, the crank angle may be determined based on the number of pulses since missing crank teeth were detected, the crank speed may be determined base on a time interval since the previous crank pulse, and the rotational deceleration may be determined based on a change in the crank speed relative to a prior crank speed. These values for each crank pulse received may be stored in a buffer, memory, or the like for subsequent analysis. The crank speed may alternately be determined based more than one time intervals between crank pulses. In one embodiment, the coast-down model may be tuned as each crank pulse is received so that when the crank speed is too low for the crank signal to be reliable, the coast-down model is adjusted to correspond to the engine conditions at hand and is ready to estimate or project or extrapolate a stopped engine crank angle. In another embodiment, once the crank speed is below a crank speed threshold, the data stored in the buffer may be used to determine a coast-down characteristic base on all or part of the data collected since the coast-down event began.

The coast-down characteristic may then be based on a plurality of time intervals between crank pulses. Determining the coast-down characteristic may include determining a frictional torque characteristic based on an average slope of the declining crank speed signal during coast-down. Determining the coast-down characteristic may also include determining a pumping torque characteristic based on an amount of ripple type fluctuation in the declining crank speed signal during coast-down. If the controller 20 has a coast-down model that requires adjustment to tune the coast-down model to match the present engine operating conditions, then determining the coast-down characteristic may involve determining one or more coefficients based on the crank signal 18 for tuning the coast-down model.

Continuing to refer to FIG. 5, at step 540 the coast-down model may be adjusted based on the coast-down characteristic to tune the coast-down model to better correspond to present engine operating conditions, and thereby make a more accurate estimate of the crank angle when the engine first stops. It will be appreciated that tuning the coast down model may be generally described as determining the values of variables within the coast-down model, or may be described as determining coefficients that are used to adjust predetermined variables within the coast-down model. Alternately, the estimation of a stopped engine crank angle may be characterized as adjusting or tuning the coast-down model until the crank speed is less than a threshold crank speed, and then the model is 'frozen' so that no further adjustments to the coast-down model can be made. The tuning process may include calculating an error term base on a difference between the measured crank angle stored in the buffer and an estimated crank angle based on the coast-down model. After that, the coast-down model is used to projects or estimates the motion of the engine until the engine speed is zero, i.e.— estimates a crank angle when the engine first stops.

At step 550 a bounce-back angle may be estimated based on the crank angle when the engine first stops. It should be understood that the engine 12 may first stop at a crank angle that does not lead to any bounce-back, or there may be other influences during engine coast-down that avoid engine bounce-back, such as one or more combustion chamber valves being open to prevent compression of the cylinder contents, thereby reducing or preventing bounce-back. In one embodiment, the coast down model is configured to comprehend or adapt to a reversal in engine direction using the same coast-down model used prior to engine reversal, so the separate step 550 to estimate a bounce back angle is not needed. Alternately, determining a bounce back angle may include estimating a crank angle when engine reversal occurs and then estimating a bounce back angle using a look-up table or distinct formula. At step 560, an estimate of a stopped engine crank angle is made using the adjusted coast-down model that may or may not include the estimate of the bounce-back angle. Performing the estimate may be triggered by determining that a period of time has passed since the last crank pulse was received, or that the model indicates that the projected crank speed is less than a stopped engine crank speed threshold.

Accordingly, an engine control system 10, a controller 20 for the engine control system 10 and a method 500 for estimating a stopped engine crank angle of an internal combustion engine is provided. A coast-down model is developed for an engine or a group of similar engines that may be stored in a controller. When an engine is coasting to a stop, a crank signal may be analyzed to determine if the engine is coasting to a stop in a manner that is similar to the model, or if the model needs to be adjusted to better match the present coast-down behavior. Estimating the stopped engine crank angle may also include estimating a bounce-back angle using the forward rotation coast down model, or a distinct model for estimating how much reverse rotation of the coasting engine is expected so that the stopped engine crank angle may be reliably estimated. By tuning the coast-down model to match the observed behavior of the engine during coast-down, the accuracy of estimating or extrapolating the stopped engine crank angle the engine can be improved. With a more accurate estimation of the stopped engine crank angle, the engine can be more readily restarted when compared to engine control system that must crank the engine to determine the engine crank angle before actually starting the engine.

While this invention has been described in terms of the preferred embodiments thereof, it is not intended to be so limited, but rather only to the extent set forth in the claims that follow.

I claim:

1. An engine control system for estimating a stopped engine crank angle of an internal combustion engine, said system comprising:
    a crank sensor configured to output a crank signal indicative of a crank angle and a crank speed; and
    a controller configured to determine the crank speed based on the crank signal, determine that the engine is coasting, determine a coast-down characteristic based on the crank signal when the crank speed is greater than a threshold speed, and estimate the stopped engine crank angle based on the coast-down characteristic, wherein the coast-down characteristic includes a pumping torque characteristic and a frictional torque characteristic, wherein the coast-down characteristic is used to adjust a coast-down model to correspond to an engine operating condition.

2. The system in accordance with claim 1, wherein the crank sensor comprises a variable reluctance sensor.

3. The system in accordance with claim 1, wherein the crank signal comprises a plurality of crank pulses.

4. The system in accordance with claim 3, wherein the crank speed is based on one or more time interval between crank pulses.

5. The system in accordance with claim 3, wherein the coast-down characteristic is based on a plurality of time intervals between crank pulses.

6. The system in accordance with claim 1, wherein the stopped engine crank angle is also based on an estimate of a bounce-back angle.

7. An engine controller for estimating a stopped engine crank angle of an internal combustion engine, said controller configured to receive a crank signal indicative of a crank angle and a crank speed, said controller further configured to determine the crank speed based on the crank signal, determine that the engine is coasting, determine a coast-down characteristic based on the crank signal when the crank speed is greater than a threshold speed, and estimate the stopped engine crank angle based on the coast-down characteristic, wherein the coast-down characteristic includes a pumping torque characteristic and a frictional torque characteristic, wherein the coast-down characteristic is used to adjust a coast-down model to correspond to an engine operating condition.

8. The controller in accordance with claim 7, wherein the controller further comprises a zero-crossing detector that inputs the crank signal and outputs a processed crank signal having constant amplitude.

9. A method for estimating a stopped engine crank angle of an internal combustion engine, said method comprising:
- providing a crank sensor configured to output a crank signal indicative of a crank angle and a crank speed;
- determining that the engine is coasting;
- determining a coast-down characteristic based on the crank signal when the crank speed is greater than a threshold speed, wherein the step of determining the coast-down characteristic includes determining a pumping torque characteristic and a frictional torque characteristic;
- estimating the stopped engine crank angle based on the coast-down characteristic; and
- adjusting a coast-down model to correspond to an engine operating condition based on the coast-down characteristic.

10. The method in accordance with claim 9, wherein the step of estimating the stopped crank angle includes estimating a bounce-back angle based on the coast-down characteristic.

11. The method in accordance with claim 9, wherein the crank signal comprises a plurality of crank pulses.

12. The method in accordance with claim 11, wherein the crank speed is based on one or more time intervals between crank pulses.

13. The method in accordance with claim 11, wherein the coast-down characteristic is based on a plurality of time intervals between crank pulses.

* * * * *